(12) United States Patent
Miyabe et al.

(10) Patent No.: US 8,572,956 B2
(45) Date of Patent: Nov. 5, 2013

(54) HYDRAULIC PRESSURE SUPPLY DEVICE OF AUTOMATIC TRANSMISSION

(75) Inventors: Tomohiro Miyabe, Nagoya (JP); Masanobu Kimura, Ama-gun (JP); Ryoichi Hibino, Nagoya (JP); Shinobu Nakamura, Nagoya (JP); Masahiro Tomida, Toyoake (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 880 days.

(21) Appl. No.: 12/726,729

(22) Filed: Mar. 18, 2010

(65) Prior Publication Data

US 2010/0236231 A1  Sep. 23, 2010

(30) Foreign Application Priority Data

Mar. 19, 2009  (JP) .................................. 2009-067636

(51) Int. Cl.
*F16D 31/02*  (2006.01)
*F16D 33/06*  (2006.01)

(52) U.S. Cl.
USPC .................................. 60/417; 60/358; 60/428

(58) Field of Classification Search
USPC .................... 60/358, 413, 417, 418, 428, 486
See application file for complete search history.

(56) References Cited

U.S. PATENT DOCUMENTS

| 5,197,787 | A * | 3/1993 | Matsuda et al. ................. 60/413 |
| 6,709,362 | B2 * | 3/2004 | Tomohiro et al. ................. 477/3 |
| 7,946,389 | B2 * | 5/2011 | Kakinami et al. ........... 184/27.2 |
| 2009/0232673 | A1 | 9/2009 | Reisch et al. |
| 2010/0311538 | A1 | 12/2010 | Miyabe et al. |

FOREIGN PATENT DOCUMENTS

| CN | 101147014 A | 3/2008 |
| JP | 8-14076 A | 1/1996 |
| JP | 11-159366 A | 6/1999 |
| JP | 2000-46166 A | 2/2000 |
| JP | 2000-313252 A | 11/2000 |
| JP | 2002-115755 A | 4/2002 |
| JP | 2003-139231 A | 5/2003 |
| JP | 3642166 B2 | 4/2005 |
| JP | 2007-278435 A | 10/2007 |

OTHER PUBLICATIONS

Japanese Office Action dated Oct. 2, 2012, issued in corresponding Japanese Patent Application No. 2009-067636 and English translation. (5 pages).
Official Action issued by Chinese Patent Office on Jul. 25, 2013 in Chinese Application No. 201010138858.6, and English language translation of Official Action (15 pgs).

\* cited by examiner

*Primary Examiner* — Michael Leslie
(74) *Attorney, Agent, or Firm* — Buchanan Ingersoll & Rooney PC

(57) ABSTRACT

A hydraulic supply device of an automatic transmission, which supplies operating oil to the automatic transmission that is able to shift power from an engine and transmit the power to drive wheels of a vehicle by selectively engaging a plurality of frictional engagement devices using hydraulic pressure is disclosed. The hydraulic supply device includes: an accumulator that accumulates operating oil; a leaking flow compensation hydraulic pump that supplies the operating oil for compensating for a flow rate of the operating oil leaking in the automatic transmission to the automatic transmission by being driven by a power source different from the engine when the engine is automatically stopped; and a hydraulic supply control mechanism configured to supply the operating oil accumulated in the accumulator to a starting frictional engagement device that is one of the plurality of frictional engagement devices to be engaged at the time of starting the vehicle when the engine is restarted after the engine is automatically stopped.

10 Claims, 4 Drawing Sheets

HYDRAULIC PRESSURE SUPPLY DEVICE OF AUTOMATIC TRANSMISSION

CROSS REFERENCE TO RELATED APPLICATIONS

This application is based on and claims priority under 35 U.S.C. §119 to Japanese Patent Application 2009-067636, filed on Mar. 19, 2009, the entire content of which is incorporated herein by reference.

TECHNICAL FIELD

This disclosure relates to a hydraulic supply device of an automatic transmission, and more particularly, to a device for supplying operating oil to an automatic transmission that is able to shift power from an engine and transmit the power to drive wheels of a vehicle by selectively engaging a plurality of frictional engagement devices using hydraulic pressure.

BACKGROUND DISCUSSION

In general, in order to enhance fuel consumption efficiency of an engine, for example, there is known a technique of, when a vehicle is stopped at an intersection or the like, automatically stopping the engine under a predetermined automatic stop condition, and then automatically restarting the engine under a predetermined restart condition. Here, when the engine is automatically stopped, an operation of a mechanical oil pump that supplies operating oil to a hydraulic control device in an automatic transmission using power of the engine is also stopped, and hydraulic pressure in the hydraulic control device is decreased by an amount of the operating oil leaking. In this state, a starting frictional engagement device (a clutch or a brake for starting) which is provided in the automatic transmission and is engaged at the time of starting the vehicle is not supplied with the hydraulic pressure needed for the engagement from the hydraulic control device and is in a released state. Thereafter, when the vehicle is started by automatically restarting the engine, if the engagement of the starting frictional engagement device is not promptly performed, a rise in the number of the engine rotations occurs, or the starting frictional engagement device is engaged after the number of engine rotations increases, which causes vibration and shock. Therefore, responsiveness of the vehicle at the time of starting is degraded.

In JP-A-2000-46166 (Patent Document 1), when an engine is automatically stopped, an electric oil pump which is externally attached is driven by an electric motor to supply operating oil discharged from the electric oil pump to a hydraulic control device in an automatic transmission. When the vehicle is started by automatically restarting the engine, hydraulic pressure needed for engaging the starting frictional engagement device in the automatic transmission is ensured by the operating oil supplied from the electric oil pump to the hydraulic control device.

In addition, in JP-A-8-14076 (Patent Document 2), when an engine is driven, operating oil discharged from a mechanical oil pump driven by power of the engine is accumulated by an accumulator in advance, and when the engine is automatically stopped, the operating oil accumulated in the accumulator is supplied to a hydraulic control device in an automatic transmission. When a vehicle is started by automatically restarting the engine, hydraulic pressure needed for engaging a starting frictional engagement device in an automatic transmission is ensured by the operating oil supplied from the accumulator to the hydraulic control device.

In addition, in JP-A-11-159366 (Patent Document 3), when an engine is automatically stopped, operating oil accumulated by an accumulator is supplied to a hydraulic control device in an automatic transmission. Here, in Patent Document 3, the accumulation of the operating oil in the accumulator is performed by driving an electric oil pump using an electric motor and supplying the operating oil discharged from the electric oil pump to the accumulator. When a vehicle is started by automatically restarting the engine, hydraulic pressure needed for engaging a starting frictional engagement device in an automatic transmission is ensured by the operating oil supplied from the accumulator to the hydraulic control device.

When the engine is automatically stopped, the hydraulic pressure in the hydraulic control device in the automatic transmission is decreased by an amount of the operating oil leaking. In order to compensate for the decrease in the hydraulic pressure in the hydraulic control device, it is preferable that the operating oil be continuously supplied to the hydraulic control device. In addition, when the vehicle is started by automatically restarting the engine, in order to promptly engage the starting frictional engagement device in the automatic transmission, it is preferable that the pressure of the operating oil supplied to the starting frictional engagement device be promptly increased.

The oil pump is suitable for continuously supplying the operating oil for a long time. However, in order to supply high-pressure operating oil instantly, there is need to increase a discharge capacity, which results in an increase in size. Therefore, the oil pump is not suitable for supplying the high-pressure operating oil instantly. As disclosed in Patent Document 1, when the vehicle is started by automatically restarting the engine, in order to promptly perform the engagement of the starting frictional engagement device using only the operating oil discharged from the electric oil pump, there is need to increase a discharge capacity of the electric oil pump. As a result, the electric oil pump size is increased, and power consumption is also increased.

In addition, the accumulator is suitable for supplying high-pressure operating oil promptly; however, an amount of the operating oil accumulated is limited, so that the accumulator is not suitable for continuously supplying the operating oil for a long time. As disclosed in Patent Documents 2 and 3, when the engine is automatically stopped, in a configuration in which only the operating oil accumulated in the accumulator is supplied to the hydraulic control device in the automatic transmission, if a stop time (a time from the automatic stop to the automatic restart) during the automatic stop of the engine is prolonged, most of the operating oil accumulated in the accumulator is consumed to compensate for the leaking operating oil (reduction in hydraulic pressure) in the hydraulic control device. As a result, when the vehicle is started by automatically restarting the engine, only with the operating oil accumulated in the accumulator, an amount of the operating oil needed for engaging the starting frictional engagement device is not met. On the other hand, when a large amount of the operating oil is to be accumulated in the accumulator in order to allow for an extension of the stop time of the engine, a large and heavy-weight accumulator is needed, thereby degrading the mounting performance of the device. In Patent Document 3, the accumulation of the operating oil in the accumulator is performed by supplying the operating oil discharged from the electric oil pump to the accumulator. However, in order to accumulate the high-pressure operating oil in the accumulator, the size of the electric oil pump needs to be increased, and power consumption is also increased.

A need thus exist for a hydraulic supply device which is not susceptible to the drawback mentioned above.

SUMMARY

A hydraulic supply device of an automatic transmission according to aspects of the disclosure employs the following configurations.

According to an aspect of the disclosure, there is provided a hydraulic supply device of an automatic transmission, which supplies operating oil to the automatic transmission that is able to shift power from an engine and transmit the power to drive wheels of a vehicle by selectively engaging a plurality of frictional engagement devices using hydraulic pressure, the hydraulic supply device including: an accumulator that accumulates operating oil; a leaking flow compensation hydraulic pump that supplies the operating oil for compensating for a flow rate of the operating oil leaking in the automatic transmission to the automatic transmission by being driven by a power source different from the engine when the engine is automatically stopped; and a hydraulic supply control mechanism configured to supply the operating oil accumulated in the accumulator to a starting frictional engagement device that is one of the plurality of frictional engagement devices to be engaged at the time of starting the vehicle when the engine is restarted after the engine is automatically stopped.

According to another aspect of the disclosure, there is provided a hydraulic supply device of an automatic transmission, which supplies operating oil to the automatic transmission that is able to shift power from an engine and transmit the power to drive wheels of a vehicle by selectively engaging a plurality of frictional engagement devices using hydraulic pressure, the hydraulic supply device including: an accumulator that accumulates operating oil; a hydraulic supply control mechanism configured to allow or block supplying of the operating oil from the accumulator to a starting frictional engagement device that is one of the plurality of frictional engagement devices to be engaged at the time of starting the vehicle; and a leaking flow compensation hydraulic pump that supplies the operating oil by a flow rate for compensating for a flow rate of the operating oil leaking in the automatic transmission by being driven by a power source different from the engine.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
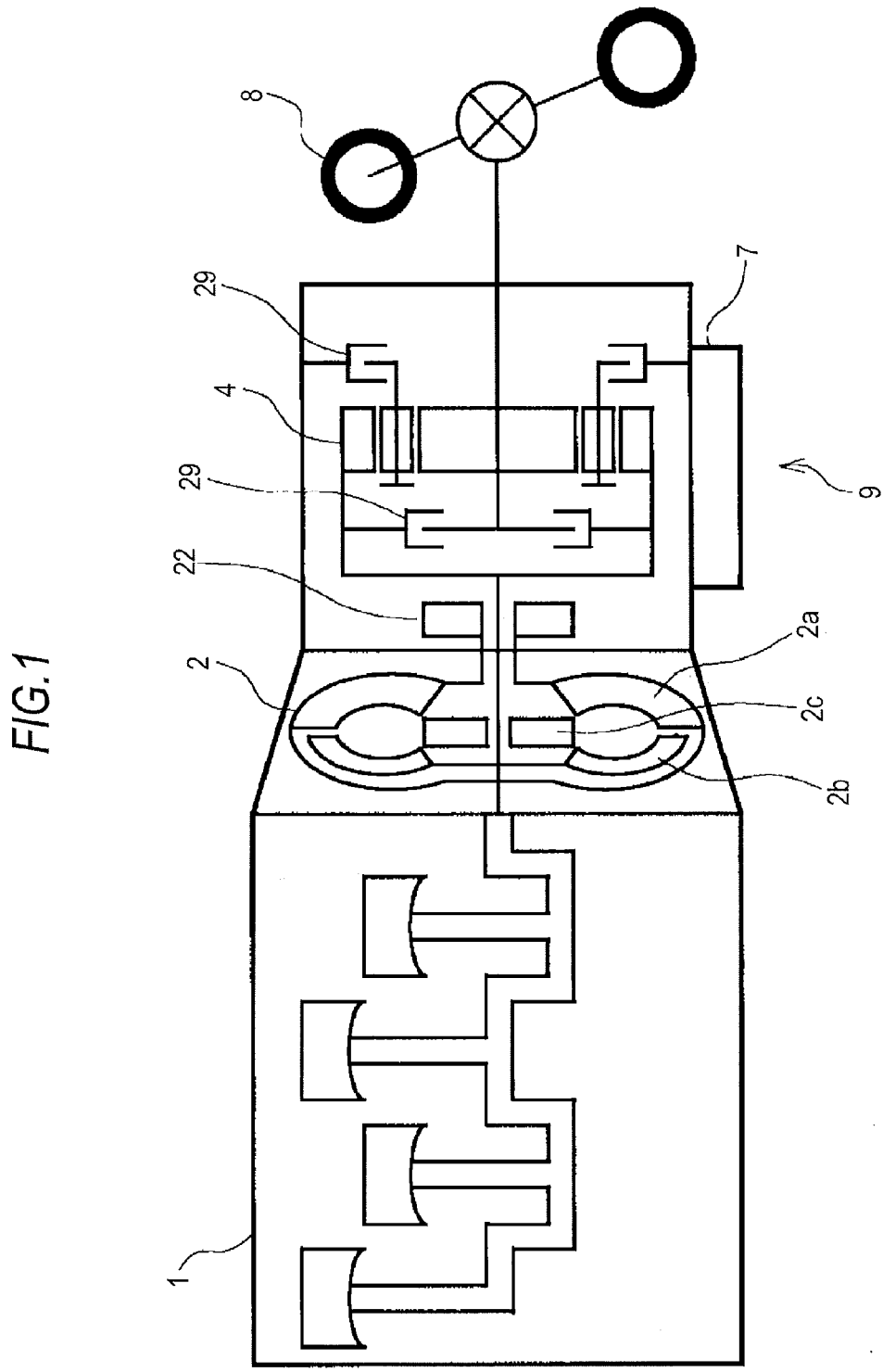
FIG. 1 is a diagram schematically illustrating a configuration of a drive system of a vehicle having an automatic transmission.

Hereinafter, exemplary embodiments disclosed here (hereinafter, referred to as embodiments) will be described with reference to the accompanying drawings.

According to one embodiment, there is provided a hydraulic supply device of an automatic transmission, which supplies operating oil to the automatic transmission that is able to shift power from an engine and transmit the power to drive wheels of a vehicle by selectively engaging a plurality of frictional engagement devices using hydraulic pressure, the hydraulic supply device including: an accumulator that accumulates operating oil; a leaking flow compensation hydraulic pump that supplies the operating oil for compensating for a flow rate of the operating oil leaking in the automatic transmission to the automatic transmission by being driven by a power source different from the engine when the engine is automatically stopped; and a hydraulic supply control mechanism for supplying the operating oil accumulated in the accumulator to a starting frictional engagement device that is one of the plurality of frictional engagement devices to be engaged at the time of starting the vehicle when the engine is restarted after the engine is automatically stopped.

According to the embodiment, a reverse flow preventing mechanism for preventing reverse flow of the operating oil from the automatic transmission to the leaking flow compensation hydraulic pump may further be included.

According to the embodiment, the accumulator may accumulate the operating oil supplied from the mechanical hydraulic pump driven by the engine.

According to the embodiment, the automatic transmission may be provided with a hydraulic detection port which is used for detecting hydraulic pressure at the time of checking an operation of the automatic transmission and at which an oil passage is connected to the mechanical hydraulic pump driven by the engine and the starting frictional engagement device, and when the engine is automatically stopped, the leaking flow compensation hydraulic pump may supply the operating oil for compensating for the flow rate of the operating oil leaking in the automatic transmission to the automatic transmission through the hydraulic detection port. In this embodiment, the automatic transmission may be provided with a line pressure regulating valve that regulates a line pressure by regulating the pressure of the operating oil from the mechanical hydraulic pump driven by the engine, and the hydraulic detection port may be used for detecting the line pressure at the time of checking the operation of the automatic transmission. In addition, in this embodiment, the hydraulic detection port may be used for detecting the hydraulic pressure of the starting frictional engagement device at the time of checking the operation of the automatic transmission.

According to the embodiment, the automatic transmission device may be provided with a hydraulic detection port which is used for detecting hydraulic pressure at the time of checking an operation of the automatic transmission and at which an oil passage is connected to the starting frictional engagement device, and when the engine is automatically restarted after the engine is automatically stopped, the hydraulic supply control mechanism may supply the operating oil accumulated in the accumulator to the starting frictional engagement device through the hydraulic detection port. In this embodiment, the automatic transmission may be provided with a line pressure regulating valve that regulates a line pressure by regulating the pressure of the operating oil from the mechanical hydraulic pump driven by the engine, and the hydraulic detection port may be used for detecting the line pressure at the time of checking the operation of the automatic transmission. In addition, in this embodiment, the hydraulic detection port may be used for detecting the hydraulic pressure of the starting frictional engagement device at the time of checking the operation of the automatic transmission.

According to another embodiment, there is provided a hydraulic supply device of an automatic transmission, which supplies operating oil to the automatic transmission that is able to shift power from an engine and transmit the power to drive wheels of a vehicle by selectively engaging a plurality of frictional engagement devices using hydraulic pressure, the hydraulic supply device including: an accumulator that accumulates operating oil; a hydraulic supply control mechanism for allowing or blocking supplying of the operating oil from the accumulator to a starting frictional engagement device that is one of the plurality of frictional engagement devices to be engaged at the time of starting the vehicle; and a leaking flow compensation hydraulic pump that supplies the operating oil by a flow rate for compensating for a flow rate of the operating oil leaking in the automatic transmission by being driven by a power source different from the engine.

According to this embodiment, the leaking flow compensation hydraulic pump may be driven by a power source different from the engine to supply the operating oil at the substantially the same flow rate as the flow rate of the operating oil leaking in the automatic transmission to the automatic transmission.

According to the embodiments, it is possible to promptly engage the starting frictional engagement device that is engaged at the time of starting the vehicle when the engine is restarted even though the stop time of the engine during the automatic stop of the engine is prolonged.

Figure 2:
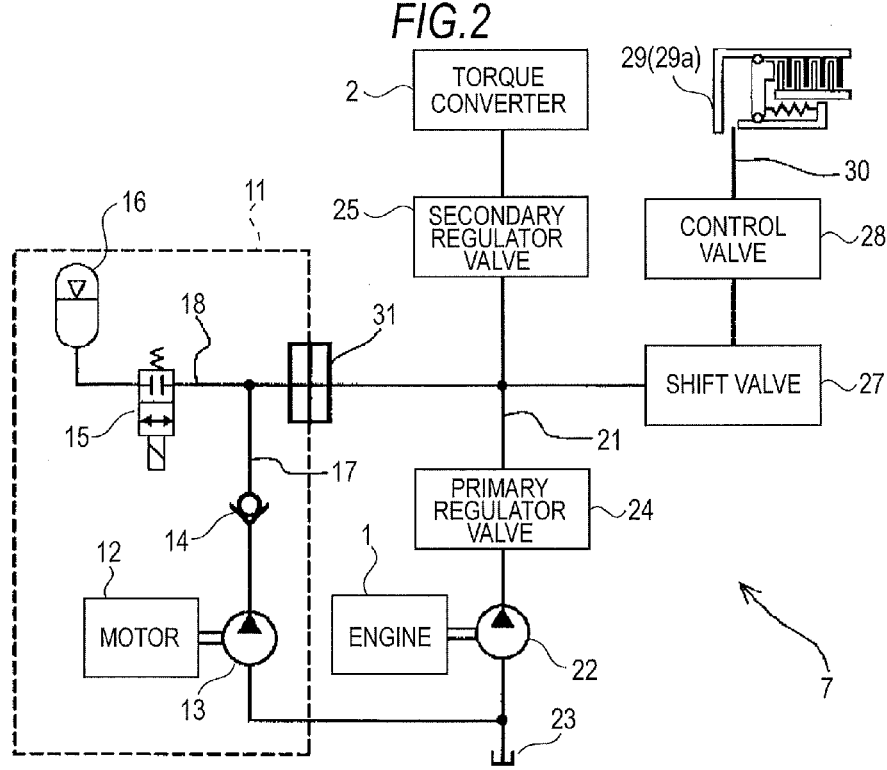
FIG. 2 is a diagram schematically illustrating a configuration of a hydraulic supply device of the automatic transmission according to an embodiment disclosed here.

FIG. 1 is a diagram schematically illustrating a configuration of a drive system of a vehicle having an automatic transmission. FIG. 2 is a diagram schematically illustrating a configuration of a hydraulic supply device of the automatic transmission according to an embodiment. Power generated by an engine (internal combustion engine) 1 is transmitted to a planetary gear train 4 of an automatic transmission 9 through a torque converter 2. Here, the torque converter 2 may include a pump impeller 2a connected to the engine 1, a turbine impeller 2b which is connected to the planetary gear train 4 and to which torque is transmitted from the pump impeller 2a through fluid (operating oil), and a fixed impeller 2c supported by a housing through a one-way clutch. The torque converter 2 has functions of transmitting torque from the engine 1 to the planetary gear train 4 through the fluid and amplifying the torque from the engine 1 when a rotational speed difference occurs between the pump impeller 2a and the turbine impeller 2b so as to transmit the amplified torque to the planetary gear train 4. The automatic transmission 9 shifts and transmits the power from the engine 1 to drive wheels 8 of the vehicle. Here, the automatic transmission 9 may include the planetary gear train 4 having a plurality of rotational degrees of freedom (in the example of FIG. 1, two degrees of freedom), a plurality of (in the example of FIG. 1, two) frictional engagement devices 29 for limiting the rotational degrees of freedom of the planetary gear train 4, and a hydraulic control device 7 for controlling engagement/release of each frictional engagement device 29 by controlling the supply of hydraulic pressures to the frictional engagement devices 29. The frictional engagement device 29 may be configured as, for example, a clutch or a brake. The automatic transmission 9 selectively engages one or more of the plurality of frictional engagements 29 using hydraulic pressure in the hydraulic control device 7 so that the planetary gear train 4 has one rotational degree of freedom, thereby transmitting the power from the engine 1 shifted by the planetary gear train 4 to the drive wheels 8. In addition, by switching between the plurality of frictional engagement devices 29 so as to be engaged, it is possible to change gear ratios of the automatic transmission 9 (planetary gear train 4) in multiple steps. In addition, the configuration of the automatic transmission 9 (the planetary gear train 4 and the frictional engagement device 29) is not limited to the configuration illustrated in FIG. 1, and may employ various configurations.

Next, an example of a configuration of the hydraulic control device 7 of the automatic transmission 9 will be described with reference to FIG. 2. In the example of FIG. 2, the hydraulic control device 7 includes a primary regulator valve 24, a secondary regulator valve 25, a shift valve 27, and a control valve 28. A mechanical oil pump 22 is rotated by the power generated by the engine 1 to be driven and pump out operating oil stored in an oil pan 23 so as to discharge the operating oil to the primary regulator valve 24. The primary regulator valve 24 regulates pressure of the operating oil discharged from the mechanical oil pump 22 to supply the regulated operating oil to a source pressure line 21, thereby setting a line pressure (pressure of the operating oil on the source pressure line 21) which is a source pressure of the hydraulic control device 7. The secondary regulator valve 25 reduces the pressure of the operating oil supplied from the source pressure line 21 from the line pressure and supplies the pressure-reduced operating oil to the torque converter 2. The operating oil supplied from the secondary regulator valve 25 is also used for lubricating in each lubricating system of the automatic transmission 9. The shift valve 27 switches between oil passages between the source pressure line 21 and the plurality of frictional engagement devices 29 depending on a traveling range and a shift stage of the automatic transmission 9, thereby determining which frictional engagement device from the plurality of frictional engagement devices 29 is to be supplied with the operating oil from the source pressure line 21. The control valve 28 reduces the pressure of the operating oil supplied from the shift valve 27 from the line pressure and supplies the pressure-reduced operating oil to the frictional engagement device 29 through an engagement pressure supply line 30. In addition, in FIG. 2, a starting frictional engagement device 29a which is engaged at the time of starting the vehicle is illustrated from among the plurality of frictional engagement devices 29. However, in practice, a number of frictional engagement devices 29 are provided depending on the number of shift stages of the automatic transmission 9. As the starting frictional engagement device 29a, for example, a frictional engagement device which is engaged when a one-speed (the maximum gear ratio) shift stage of the automatic transmission 9 is selected may be selected. The number of starting frictional engagement devices 29a may be one or plural.

According to the embodiment, in order to enhance fuel consumption efficiency of the engine 1, controlling the engine 1 to automatically stop or automatically restart according to a travelling state of the vehicle is performed by an electronic control device. An example of an automatic stop condition of the engine 1 includes a condition of a "stopped state of the vehicle". An N range or a P range of the travelling range of the automatic transmission 9 means the "stopped state of the vehicle" and "accelerator off" (a state where an accelerator pedal is not pushed). A D range of the travelling range of the automatic transmission 9 means the "stopped state of the vehicle", the "accelerator off", and "brake on" (a state where a brake pedal is pushed). An example of the automatic restart condition of the engine 1 is a state where the automatic stop condition is not satisfied. Here, the automatic stop condition and the automatic restart condition of the engine 1 are not limited to the above examples and may use other conditions.

When the vehicle is stopped and the automatic stop condition of the engine 1 is satisfied such that the engine 1 is automatically stopped, the rotation of the mechanical oil pump 22 is stopped and the operating oil is not discharged from the mechanical oil pump 22. The operating oil supplied to the torque converter 2, the frictional engagement devices 29, and the lubricating systems from the hydraulic control device 7 leaks slowly and is transferred to the oil pan 23, so that the hydraulic pressure in the hydraulic control device 7 decreases by the amount of the operating oil leaking. In this state, the hydraulic pressure needed for the starting frictional engagement device 29a for the engagement is not supplied from the hydraulic control device 7 and the starting frictional engagement device 29a is in a released state. Thereafter, when the automatic restart condition of the engine 1 is satisfied and the vehicle is started by automatically restarting the engine 1, if the engagement of the starting frictional engagement device 29a is not promptly performed, racing of the number of engine rotations occurs, or the starting frictional engagement device 29a is engaged after the number of engine rotations increases, resulting in vibration or shock. This means that responsiveness of the vehicle at starting is degraded, and a driver of the vehicle feels uncomfortable and uneasy.

Therefore, according to this embodiment, when the vehicle is stopped and the engine 1 is automatically stopped, the operating oil is supplied to the automatic transmission 9 (the hydraulic control device 7) from the hydraulic supply device 11 such that the leakage of the operating oil (the reduction in hydraulic pressure) in the automatic transmission (the hydraulic control device 7) is compensated for. Hereinafter, the example of the configuration of the hydraulic supply device 11 will be described with reference to FIG. 2.

The hydraulic supply device 11 includes an electric motor 12, a leaking flow compensation oil pump 13, a check valve 14, a hydraulic supply control valve 15, and an accumulator 16. The leaking flow compensation oil pump 13 which is externally attached is driven by the power generated by the electric motor 12 which is a power source different from the engine 1 so as to rotate and pump the operating oil stored in the oil pan 23 so as to be discharged to a pump pressure supply line 17. The pump pressure supply line 17 is connected to the source pressure line 21 of the hydraulic control device 7. The check valve 14 is provided between an outlet of the leaking flow compensation oil pump 13 and the pump pressure supply line 17 to allow the operating oil to flow from the outlet of the leaking flow compensation oil pump 13 toward the pump pressure supply line 17 and blocks the reverse flow of the operating oil from the pump pressure supply line 17 toward the outlet of the leaking flow compensation oil pump 13. By the check valve 14, the flow of the operating oil from the outlet of the leaking flow compensation oil pump 13 toward the automatic transmission 9 (the source pressure line 21 of the hydraulic control device 7) is allowed, and the reverse flow of the operating oil from the automatic transmission 9 (the source pressure line 21 of the hydraulic control device 7) toward the outlet of the leaking flow compensation oil pump 13 is blocked. Here, the leaking flow compensation oil pump 13 is a small oil pump with low discharge pressure and low flow rate for supplying the operating oil for compensating for the flow rate of the operating oil leaking toward the oil pan 23 in the automatic transmission 9 (hydraulic control device 7) to the automatic transmission 9 (hydraulic control device 7) and has a capacity small enough relative to that of the mechanical oil pump 22. The operation of the leaking flow compensation oil pump 13 (the electric motor 12) is controlled by the electronic control device. In addition, the leaking flow compensation oil pump 13 may be driven by a power source other than the electric motor 12, such as a small engine different from the engine 1 or the like.

The accumulator 16 stores (accumulates) energy of the operating oil. The hydraulic supply control valve 15 is provided between the accumulator 16 and an accumulated pressure supply line 18. The accumulated pressure supply line 18 is connected to the pump pressure supply line 17 and the source pressure line 21 of the hydraulic control device 7. When the hydraulic supply control valve 15 is opened to allow the accumulator 16 and the accumulated pressure supply line 18 to communicate with each other, the supplying of the operating oil from the accumulator 16 to the automatic transmission 9 (the source pressure line 21 of the hydraulic control device 7) is allowed. Accordingly, the supplying of the operating oil accumulated in the accumulator 16 to the starting frictional engagement device 29a through the shift valve 27, the control valve 28, and an engagement pressure supply line 30 is allowed. On the other hand, when the hydraulic supply control valve 15 is closed to block the communication of the accumulator 16 and the accumulated pressures supply line 18, the supplying of the operating oil from the accumulator 16 to the automatic transmission 9 (the source pressure line 21 of the hydraulic control device 7) is blocked. Accordingly, the supplying of the operating oil accumulated in the accumulator 16 to the starting frictional engagement device 29a through the shift valve 27, the control valve 28, and the engagement pressure supply line 30 is blocked. The operation (opening and closing) of the hydraulic supply control valve 15 is controlled by the electronic control device.

For connection between the hydraulic supply device 11 and the automatic transmission 9 (hydraulic control device 7), a hydraulic detection port generally provided in the automatic transmission 9 may be used. Here, the hydraulic detection port is configured by mounting a pressure sensor to the hydraulic detection port to detect hydraulic pressure at the time of checking the operation of the automatic transmission 9. After the checking of the operation of the automatic transmission 9 is terminated, there is no need to mount the pressure sensor to the hydraulic detection port, so that it becomes possible to connect the hydraulic supply device 11 to the hydraulic control device 7 though the hydraulic detection port. In the example of the configuration illustrated in FIG. 2, as the hydraulic detection port at which an oil passage is connected to both the outlet of the mechanical oil pump 22 and the starting frictional engagement device 29a in the stopped state of the mechanical oil pump 22 (a state where hydraulic pressure of the hydraulic control device 7 is reduced), through a line pressure detection port 31 to which the pressure sensor for detecting a line pressure (pressure of the operating oil in the source pressure line 21) at the time of checking the operation of the automatic transmission 9 is mounted, the hydraulic supply device 11 and the hydraulic control device 7 (the pump pressure supply line 17, the accumulated pressure supply line 18, and the source pressure line 21) are connected to each other. Accordingly, the operating oil discharged from the leaking flow compensation oil pump 13 can be supplied to the automatic transmission 9 (the source pressure line 21 of the hydraulic control device 7) through the line pressure detection port 31 (the hydraulic detection port), and the operating oil accumulated in the accumulator 16 can be supplied to the starting frictional engagement device 29a through the line pressure detection port 31 when the hydraulic supply control valve 15 is opened.

The accumulation of the operating oil in the accumulator 16 is performed when the engine 1 is operated (when the engine 1 generates power). For example, in a case where the accumulation of the operating oil in the accumulator 16 is performed, such as in a case where the pressure of the operating oil in the accumulator 16 is lower than a lower limit, the electronic control device operates to open the hydraulic supply control valve 15 so as to allow the communication between the accumulator 16 and the accumulated pressure supply line 18 (the source pressure line 21 of the hydraulic control device 7). Accordingly, the operating oil discharged from the mechanical oil pump 22 is supplied to the accumulator 16 through the primary regulator valve 24, the source pressure line 21, the line pressure detection port 31 (hydraulic detection port), and the accumulated pressure supply line 18. At that time, the reverse flow of the operating oil from the accumulator 16 (the accumulated pressure supply line 18) to the leaking flow compensation oil pump 13 is prevented by the check valve 14. As described above, the accumulator 16 accumulates the operating oil supplied from the mechanical oil pump 22. On the other hand, for example, in a case where the accumulation of the operating oil in the accumulator 16 is terminated, such as in a case where the pressure of the operating oil in the accumulator 16 is higher than an upper limit, the electronic control device operates to close the hydraulic supply control valve 15 to block the communication between the accumulator 16 and the accumulated pressure supply line 18 (the source pressure line 21 of the hydraulic control device 7). Accordingly, the supplying of the operating oil discharged from the mechanical oil pump 22 to the accumulator 16 is blocked. In addition, the pressure of the operating oil in the accumulator 16 may be detected by a pressure detecting mechanism such as a pressure sensor or a pressure switch.

When the vehicle is stopped and the engine 1 is automatically stopped, the electronic control device drives the leaking flow compensation oil pump 13 using the electric motor 12. The operating oil discharged from the leaking flow compensation oil pump 13 is supplied to the source pressure line 21 of the hydraulic control device 7 through the pump pressure supply line 17 and the line pressure detection port (the hydraulic detection port) and supplied to all the components of the hydraulic control device 7 such as the primary regulator valve 24, the secondary regulator valve 25, the shift valve 27, and the control valve 28. At that time, the electronic control device operates to close the hydraulic supply control valve 15. Accordingly, the supplying of the operating oil from the accumulator 16 to the hydraulic control device 7 is blocked by the hydraulic supply control valve 15. The operating oil discharged from the leaking flow compensation oil pump 13 is supplied to the hydraulic control device 7 without passing through the hydraulic supply control valve 15. Here, the driving (the supplying of the operating oil from the leaking flow compensation oil pump 13 to the hydraulic control device 7) of the leaking flow compensation oil pump 13 may be started after the rotation of the engine 1 (the mechanical oil pump 22) is stopped (for example, immediately after the engine 1 is stopped), or the driving of the leaking flow compensation oil pump 13 may be started when the automatic stop condition of the engine 1 described above is satisfied. Here, the leaking flow compensation oil pump 13 supplies the operating oil to the automatic transmission 9 (the hydraulic control device 7) by a flow rate for compensating for the flow rate leaking toward the oil pan 23 in the automatic transmission 9 (the hydraulic control device 7). More specifically, the capacity of the leaking flow compensation oil pump 13 and the number of rotations of the electric motor 12 are set so that the leaking flow compensation oil pump 13 supplies the operating oil to the hydraulic control device 7 at the same (or substantially the same) flow rate as the flow rate of the operating oil leaking in the hydraulic control device 7. Accordingly, when the engine 1 (the mechanical oil pump 22) is stopped, a reduction in the hydraulic pressure due to the leakage of the operating oil toward the oil pan 23 in the hydraulic control device 7 can be prevented. It is preferable that the supplying of the operating oil from the leaking flow compensation oil pump 13 to the hydraulic control device 7 be continuously performed while the above-mentioned automatic restart condition of the engine 1 is not satisfied (while the engine 1 is not automatically restarted). In addition, the flow rate of the operating oil leaking toward the oil pan 23 in the automatic transmission 9 (the hydraulic control device 7) may be, for example, experimentally obtained.

After the engine 1 is automatically stopped, when the engine 1 is automatically restarted by a starter motor to start the vehicle, the electronic control device switches the hydraulic supply control valve 15 from the closed state to the opened state. When the hydraulic supply control valve 15 is opened, the operating oil accumulated in the accumulator 16 is supplied to the source pressure line 21 of the hydraulic control device 7 through the accumulated pressure supply line 18 and the line pressure detection port 31 (hydraulic detection port) and is supplied to the starting frictional engagement device 29a through the shift valve 27, the control valve 28, and the engagement pressure supply line 30. At that time, the reverse flow of the operating oil from the accumulator 16 to the outlet of the leaking flow compensation oil pump 13 is prevented by the check valve 14, and the driving of the shift valve 27 is controlled by the electronic control device so as to allow the communication between the source pressure line 21 and the starting frictional engagement device 29a. In addition, at that time, the electronic control device operates to stop the driving of the leaking flow compensation oil pump 13 by the electric motor 12. Here, the switching of the hydraulic supply control valve 15 to the opened state (the supplying of the operating oil from the accumulator 16 to the starting frictional engagement device 29a) may be started when the above-mentioned automatic restart condition of the engine 1 is satisfied, the switching of the hydraulic supply control valve 15 to the opened state may be started when cranking of the engine 1 by the starter motor is performed, or the switching of the hydraulic supply control valve 15 to the opened state may be started after (for example, immediately after) the automatic restart of the engine 1 is completed. When the engagement of the starting frictional engagement device 29a is performed by the pressure of the operating oil supplied from the accumulator 16 to the starting frictional engagement device 29a, a shift stage (for example, one-speed) of the automatic transmission 9 is selected. Accordingly, after automatically restarting the engine 1, the power of the engine 1 may be shifted and transmitted by the automatic transmission 9 to the drive wheels 8 to start the vehicle. In this embodiment, before the engine 1 is automatically restarted (while the engine 1 is stopped), the supplying of the operating oil from the leaking flow compensation oil pump 13 to the hydraulic control device 7 is performed to compensate for the leakage of the operating oil in the hydraulic control device 7 (a reduction in the hydraulic pressure). Therefore, the operating oil accumulated in the accumulator 16 is hardly consumed to compensate for the leakage of the operating oil in the hydraulic control device 7 (an increase in the hydraulic pressure) but is used for engaging the starting frictional engagement device 29a. Therefore, the pressure of the operating oil supplied to the starting frictional engagement device 29a can be promptly increased, thereby promptly performing the engagement of the starting frictional engagement device 29a.

After automatically restarting the engine 1, the mechanical oil pump 22 is driven to rotate by the power of the engine 1, so that it is possible to supply the operating oil from the mechanical oil pump 22 to the hydraulic control device 7. In addition, it is also possible to accumulate the operating oil in the accumulator 16 by the operating oil discharged from the mechanical oil pump 22. When the pressure of the operating oil in the accumulator 16 is increased higher than the upper limit, the electronic control device switches the hydraulic supply control valve 15 from the opened state to the closed state, thereby terminating the accumulation of the operating oil in the accumulator 16.

In addition, even when the above-mentioned automatic stop condition of the engine 1 is satisfied, if the pressure of the operating oil in the accumulator 16 is lower than the set value, the electronic control device may prohibit (not allow) the automatic stop of the engine 1. Here, the set value may be set to a threshold value of the pressure of the operating oil at which the starting frictional engagement device 29a can be engaged. In this case, the hydraulic supply control valve 15 is controlled to be in the opened state such that the accumulation of the operating oil in the accumulator 16 is performed by the operating oil discharged from the mechanical oil pump 22. Therefore, after the pressure of the operating oil in the accumulator 16 is increased higher than the set value, the automatic stop of the engine 1 is allowed (performed).

According to this embodiment described above, when the vehicle is stopped and the engine 1 is automatically stopped, the operating oil for compensating for the leakage of the operating oil in the hydraulic control device 7 is continuously supplied to the hydraulic control device 7 from the leaking flow compensation oil pump 13, so that even though the stop time of the engine 1 (the mechanical oil pump 22) is prolonged, a reduction in the hydraulic pressure in the hydraulic control device 7 can be suppressed. The leaking flow compensation oil pump 13 is suitable for continuously supplying the operating oil for a long time, and only the minimum flow rate needed for compensating for the leakage (a reduction in the hydraulic pressure) of the operating oil toward the oil pan 23 in the hydraulic control device 7 needs to be continuously supplied to the hydraulic control device 7, so that the discharge flow rate of the leaking flow compensation oil pump 13 may be a very small flow rate, and the power consumption of the electric motor 12 may be very small. Therefore, size decreases in the electric motor 12 and the leaking flow compensation oil pump 13 can be achieved. In addition, after the engine 1 is automatically stopped, when the engine 1 is automatically restarted to start the vehicle, the hydraulic supply control valve 15 is opened to supply the operating oil accumulated in the accumulator 16 to the starting frictional engagement device 29a, thereby engaging the starting frictional engagement device 29a. The accumulator 16 is suitable for supplying high-pressure operating oil promptly, and the reduction in the hydraulic pressure in the hydraulic control device 7 is suppressed by the supplying of the operating oil from the leaking flow compensation oil pump 13, so that the operating oil accumulated in the accumulator 16 is effectively used for engaging the starting frictional engagement device 29a without being consumed to increase the hydraulic pressure in the hydraulic control device 7. Therefore, when the stop time of the engine 1 (the mechanical oil pump 22) is prolonged, the pressure of the operating oil supplied to the starting frictional engagement device 29a can be promptly increased, so that the engagement of the starting frictional engagement device 29a can be performed within a short time. In addition, the accumulator 16 may store a needed amount of the operating oil for performing the engagement of the starting frictional engagement device 29a, so that a large amount of the operating oil does not need to be stored in the accumulator 16, thereby achieving a decrease in size of the accumulator 16.

As described above, according to this embodiment, by using the leaking flow compensation oil pump 13 to continuously compensate for the flow rate of the operating oil leaking in the hydraulic control device 7 and the accumulator 16 to promptly supply the high-pressure operating oil to the starting frictional engagement device 29a, even though the stop time of the engine 1 that is automatically stopped is prolonged, the engagement of the starting frictional engagement device 29a can be promptly performed when the engine 1 is automatically restarted. Therefore, vibration or shock that occurs when racing of the number of engine rotations occurs or when the starting frictional engagement device 29a is engaged after the number of engine rotations increases can be prevented. As a result, it is possible to enhance the responsiveness of the vehicle at the time of starting. In addition, the small-size leaking flow compensation oil pump 13 and the accumulator 16 are used, so that it is possible to implement the hydraulic supply device 11 with little power and energy consumption at low cost.

In addition, according to this embodiment, the hydraulic supply device 11 is connected to the hydraulic control device 7 using the hydraulic detection port (the line pressure detection port 31) which is generally provided to check the operation (detect the hydraulic pressure at the time of checking the operation) of the automatic transmission 9, so that it is possible to easily mount the hydraulic supply device 11 to a peripheral portion of the existing automatic transmission 9 without a change in design of the automatic transmission 9. In addition, by supplying the operating oil accumulated in the accumulator 16 to the starting frictional engagement device 29a through the source pressure line 21 (the line pressure detection port 31) of the hydraulic control device 7, it is possible to freely select the starting frictional engagement device 29a from among the plurality of frictional engagement devices 29, so that it is possible to cope with a start besides the general one-speed start. For example, it is possible to cope with a two-speed start by selecting a frictional engagement device that is engaged when the two-speed shift stage of the automatic transmission 9 is selected as the starting frictional engagement device 29a, and it is possible to cope with a reverse start by selecting a frictional engagement device that is engaged when a reverse shift stage of the automatic transmission 9 is selected. In addition, even when the same one-speed shift stage is implemented, it is possible to change the shift valve 27 and the control valve 28 which are operated in the hydraulic control device 7.

In order to show the effectiveness of the hydraulic supply device 11 according to this embodiment, experimental results using the automatic transmission 9 of the vehicle illustrated in FIGS. 3A to 5B are shown. On the upper parts of FIGS. 3A to 5B, the line pressure in the hydraulic control device 7, the hydraulic pressure (clutch pressure) of the starting frictional engagement device 29a, and the hydraulic pressure (accumulator pressure) of the accumulator 16 are shown. In addition, on the lower parts of FIGS. 3A to 5B, the number of engine rotations and the number of rotations of an output shaft of the torque converter 2 (the number of turbine rotations) are shown.

Figure 3A:
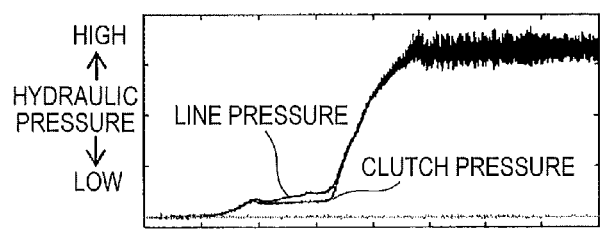
FIGS. 3A and 3B are diagrams showing experimental results using the automatic transmission of the vehicle.
Figure 3B:
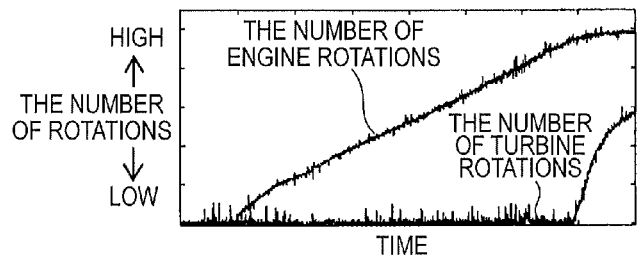

FIGS. 3A and 3B show experimental results in a case where the engine 1 is stopped for a few minutes, during which time the operating oil is supplied to the hydraulic control device 7 through the line pressure detection port 31 from the electric oil pump which is externally attached (without supplying the operating oil from the accumulator 16), and thereafter the engine 1 is restarted. In this case, as illustrated in FIGS. 3A and 3B, it takes time to increase the line pressure and the clutch pressure to sufficient levels from the restart of the engine 1, so that it is difficult to properly and promptly start the vehicle.

Figure 4A:
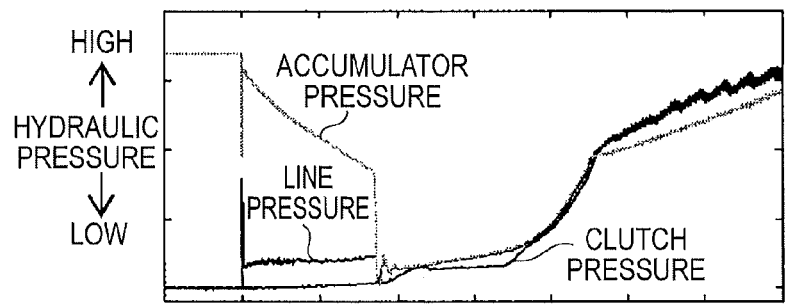
FIGS. 4A and 4B are diagrams showing experimental results using the automatic transmission of the vehicle.
Figure 4B:
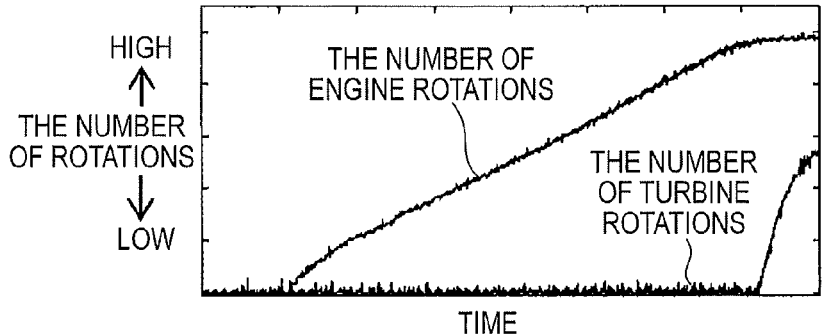

FIGS. 4A and 4B show experimental results in a case where the engine 1 is stopped for a few minutes (without supplying the operating oil from the electric oil pump which is externally attached to the hydraulic control device 7), and thereafter the engine 1 is restarted and simultaneously the operating oil accumulated in the accumulator 16 is supplied to the starting frictional engagement device 29a through the line pressure detection port 31. In this case, as shown in FIGS. 4A and 4B, the line pressure is slightly increased by the operating oil discharged from the accumulator 16. However, the clutch pressure is not increased until the engagement of the starting frictional engagement device 29a is performed, and finally all the operating oil accumulated in the accumulator 16 is used. This is because, the operating oil leaks from each component of the automatic transmission 9 (the hydraulic control device 7) toward the oil pan 23 during the stopping of the engine 1, and therefore, all the operating oil discharged from the accumulator 16 is consumed to fill the operating oil that leaks before being supplied to the starting frictional engagement device 29a.

Figure 5A:
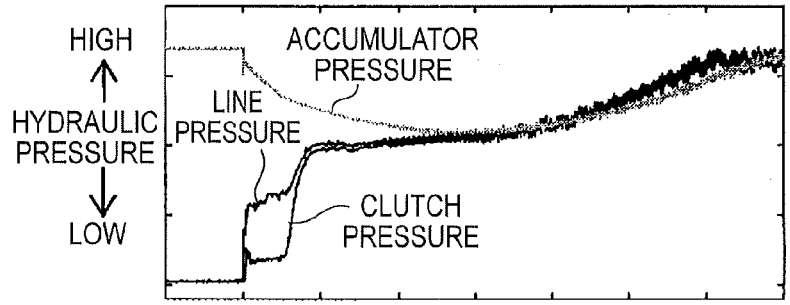
FIGS. 5A and 5B are diagrams showing experimental results using the automatic transmission of the vehicle.
Figure 5B:
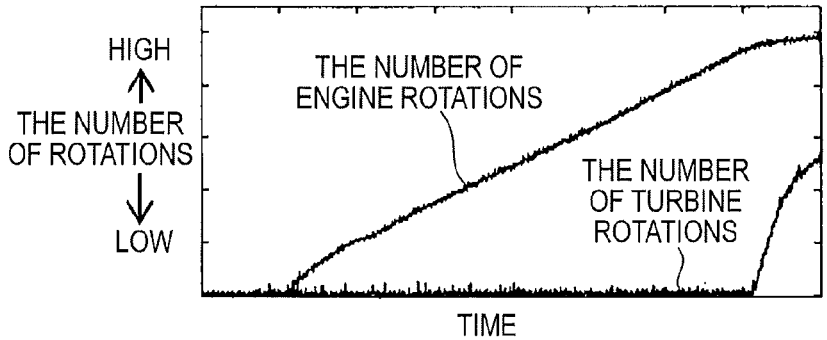

FIGS. 5A and 5B show experimental results in a case where only the minimum operating oil needed for compensating for the flow rate leaking is supplied from the leaking flow compensation oil pump 13 to the hydraulic control device 7 by using the hydraulic supply device 11 according to the embodiment during the stopping of the engine 1, the engine 1 is restarted and simultaneously the operating oil accumulated in the accumulator 16 is supplied to the starting frictional engagement device 29a through the line pressure detection port 31. In this case, as illustrated in FIGS. 5A and 5B, the line pressure and the clutch pressure are increased to sufficient levels from the restart of the engine 1, so that the vehicle can be properly and promptly started.

Next, an example of another configuration of the embodiment will be described.

Figure 6:
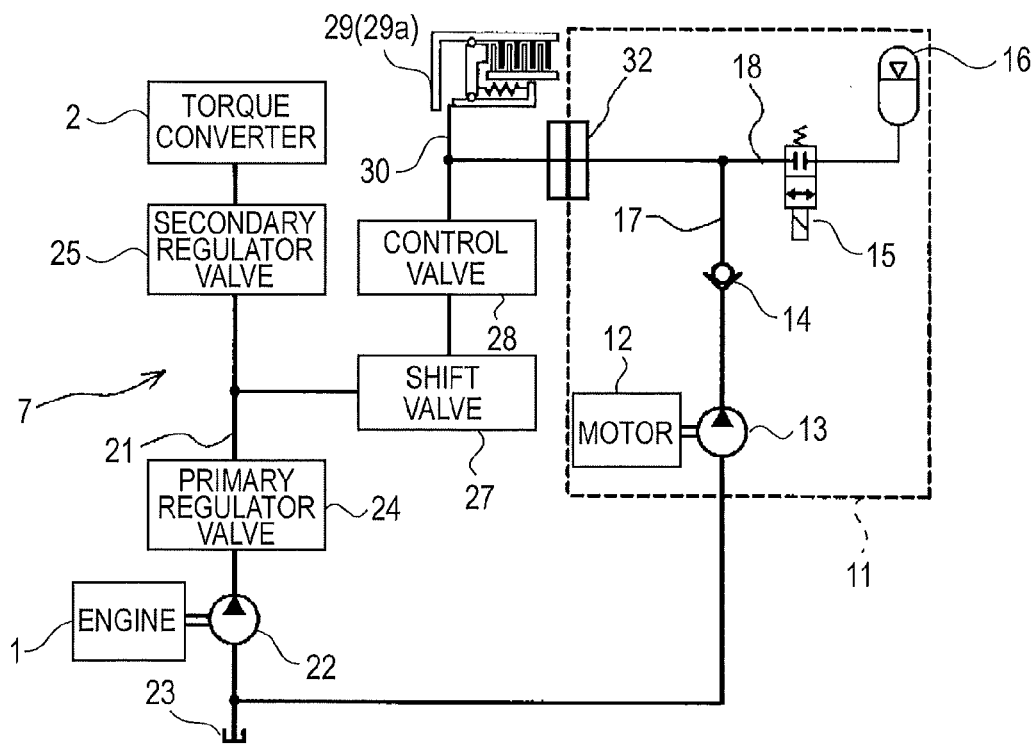
FIG. 6 is a diagram schematically illustrating another configuration of the hydraulic supply device of the automatic transmission according to the embodiment disclosed here.

In an example of a configuration illustrated in FIG. 6, the pump pressure supply line 17 and the accumulated pressure supply line 18 of the hydraulic supply device 11 are connected to the engagement pressure supply line 30 (the starting frictional engagement device 29a) of the hydraulic control device 7. The flow of the operating oil from the outlet of the leaking flow compensation oil pump 13 to the automatic transmission 9 (the engagement pressure supply line 30 of the hydraulic control device 7) is allowed by the check valve 14, and the reverse flow of the operating oil from the automatic transmission 9 (the engagement pressure supply line 30 of the hydraulic control device 7) to the outlet of the leaking flow compensation oil pump 13 is blocked. In addition, when the hydraulic supply control valve 15 is opened, the supplying of the operating oil from the accumulator 16 to the automatic transmission 9 (the engagement pressure supply line 30 of the hydraulic control device 7) is allowed and the supplying of the operating oil accumulated in the accumulator 16 to the starting frictional engagement device 29a through the engagement pressure supply line 30 is allowed. On the other hand, when the hydraulic supply control valve 15 is closed, the supplying of the operating oil from the accumulator 16 to the automatic transmission 9 (the engagement pressure supply line 30 of the hydraulic control device 7) is blocked, and the supplying of the operating oil accumulated in the accumulator 16 to the starting frictional engagement device 29a through the engagement pressure supply line 30 is blocked.

In the example of the configuration illustrated in FIG. 6, for connection between the hydraulic supply device 11 and the automatic transmission 9 (the hydraulic control device 7), the hydraulic detection port generally provided in the automatic transmission 9 may be used. Here, as the hydraulic detection port at which an oil passage is connected to both the outlet of the mechanical oil pump 22 and the starting frictional engagement device 29a in the stopped state of the mechanical oil pump 22, through the engagement pressure detection port 32 to which the pressure sensor for detecting the hydraulic pressure of the starting frictional engagement device 29a is installed at the time of checking the operation of the automatic transmission 9 is attached, the hydraulic supply device 11 and the hydraulic control device 7 (the pump pressure supply line 17, the accumulated pressure supply line 18, and the engagement pressure supply line 30) are connected to each other. Accordingly, the operating oil discharged from the leaking flow compensation oil pump 13 can be supplied to the automatic transmission 9 (the hydraulic control device 7) through the engagement pressure detection port 32 (the hydraulic detection port), and the operating oil accumulated in the accumulator 16 can be supplied to the starting frictional engagement device 29a through the engagement pressure detection port 32 when the hydraulic supply control valve 15 is opened.

When the accumulation of the operating oil is performed in the accumulator 16, the hydraulic supply control valve 15 is controlled to be in the opened state so as to supply the operating oil discharged from the mechanical oil pump 22 to the accumulator 16 through the primary regulator valve 24, the source pressure line 21, the shift valve 27, the control valve 28, the engagement pressure supply line 30, the engagement pressure detection port 32 (the hydraulic pressure detection port), and the accumulated pressure supply line 18. In addition, when the engine 1 is automatically stopped, the leaking flow compensation oil pump 13 is driven by the electric motor 12 so as to supply the operating oil discharged from the leaking flow compensation oil pump 13 to the engagement pressure supply line 30 of the hydraulic control device 7 through the engagement pressure detection port 32 (the hydraulic detection port) and to all the components of the hydraulic control device 7 such as the primary regulator valve 24, the secondary regulator valve 25, the shift valve 27, and the control valve 28. In addition, when the engine 1 is automatically restarted, the hydraulic supply control valve 15 is switched from the closed state to the opened state so as to supply the operating oil accumulated in the accumulator 16 to the starting frictional engagement device 29a through the engagement pressure detection port 32 and the engagement pressure supply line 30. In addition, configurations and operations which are not described are the same as those of the example of the configuration illustrated in FIG. 2.

Figure 7:
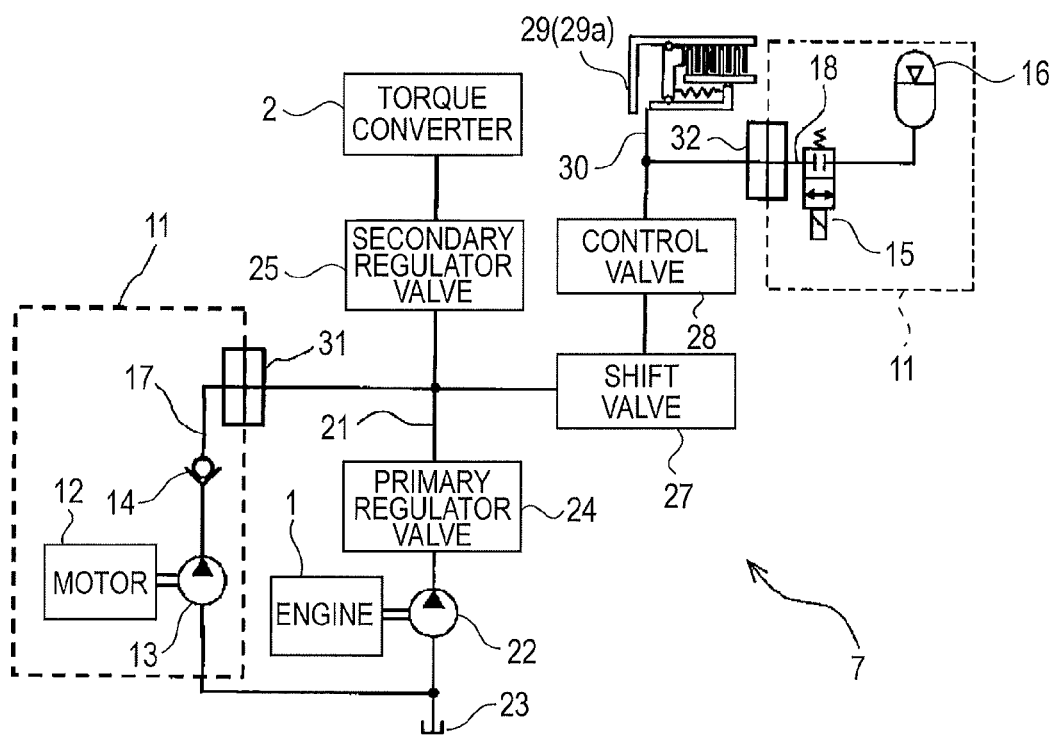
FIG. 7 is a diagram schematically illustrating another configuration of the hydraulic supply device of the automatic transmission according to the embodiment disclosed here.

In an example of a configuration illustrated in FIG. 7, the pump pressure supply line 17 of the hydraulic supply device 11 is connected to the source pressure line 21 of the hydraulic control device 7, and the accumulated pressure supply line 18 of the hydraulic supply line 11 is connected to the engagement pressure supply line 30 (the starting frictional engagement device 29a) of the hydraulic control device 7. Here, the pump pressure supply line 17 is connected to the source pressure line 21 through the line pressure detection port 31, and the accumulated pressure supply line 18 is connected to the engagement pressure supply line 30 through the engagement pressure detection port 32. Accordingly, the operating oil discharged from the leaking flow compensation oil pump 13 can be supplied to the automatic transmission 9 (the hydraulic control device 7) through the line pressure detection port 31, and when the hydraulic supply control valve 15 is opened, the operating oil accumulated in the accumulator 16 can be supplied to the starting frictional engagement device 29a through the engagement pressure detection port 32. An operation of supplying the operating oil from the leaking flow compensation oil pump 13 to the hydraulic control device 7 is the same as that of the example of the configuration illustrated in FIG. 2, and an operation of supplying the operating oil from the accumulator 16 to the starting frictional engagement device 29a is the same as that of the example of the configuration illustrated in FIG. 6.

In the examples of the configurations which are illustrated in FIGS. 6 and 7 and described above, even though the stop time of the engine 1 during the automatic stop of the engine 1 is prolonged, in the case where the engine 1 is automatically restarted, the engagement of the starting frictional engagement device 29a can be promptly performed. In addition, in the examples of the configurations illustrated in FIGS. 6 and 7, the length of the oil passage from the accumulator 16 to the starting frictional engagement device 29a can be shortened, so that loss of the hydraulic pressure applied from the accumulator 16 to the starting frictional engagement device 29a can be reduced. Therefore, it is possible to further reduce the size of the accumulator 16.

In addition, the operating oil discharged from the leaking flow compensation oil pump 13 is used for compensating for the leakage of the operating oil in the hydraulic control device 7 toward the oil pan 23, so that it is preferable that the operating oil be supplied to all the components of the hydraulic control device 7. Accordingly, it is preferable that connection positions of the leaking flow compensation oil pump 13 and the check valve 14 (the pump pressure supply line 17) to the hydraulic control device 7 be positions (the hydraulic pressure detection port) at which the oil passage is connected to both the outlet of the mechanical oil pump 22 and the starting frictional engagement device 29a in the stopped state of the mechanical oil pump 22 (the state where the hydraulic pressure of the hydraulic control device 7 is reduced). When the condition is satisfied, it is possible to connect the leaking flow compensation oil pump 13 and the check valve 14 (the pump pressure supply line 17) to the positions (the hydraulic detection port) other than the line pressure detection port 31 and the engagement pressure detection port 32 in the hydraulic control device 7.

In addition, since the operating oil discharged from the accumulator 16 is used for engaging the starting frictional engagement device 29a, it is preferable that connection positions of the accumulator 16 and the hydraulic supply control valve 15 (the accumulated pressure supply line 18) to the hydraulic control device 7 be positions (the hydraulic detection port) at which the oil passage is connected to the starting frictional engagement device 29a. When the condition is satisfied, it is possible to connect the accumulator 16 and the hydraulic supply control valve 15 (the accumulated pressure supply line 18) to the positions (the hydraulic detection port) other than the line pressure detection port 31 and the engagement pressure detection port 32 in the hydraulic control device 7.

While the embodiments have been described above, the disclosure is not limited by the embodiments and can be modified in various manners without departing from the spirit and scope of the disclosure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly it is expressly intended that all such variations, changes and equivalents which fall within the spirit and scope of the present invention as defined in the claims, be embraced thereby.

What is claimed is:

1. A hydraulic supply device of an automatic transmission, which supplies operating oil to the automatic transmission that is able to shift power from an engine and transmit the power to drive wheels of a vehicle by selectively engaging a plurality of frictional engagement devices using hydraulic pressure, the hydraulic supply device comprising:
    an accumulator that accumulates operating oil;
    a leaking flow compensation hydraulic pump that supplies the operating oil for compensating for a flow rate of the operating oil leaking in the automatic transmission to the automatic transmission by being driven by a power source different from the engine when the engine is automatically stopped;
    a hydraulic supply control mechanism configured to supply the operating oil accumulated in the accumulator to a starting frictional engagement device that is one of the plurality of frictional engagement devices to be engaged at the time of starting the vehicle when the engine is restarted after the engine is automatically stopped;
    a reverse flow preventing mechanism configured to prevent reverse flow of the operating oil from the automatic transmission to the leaking flow compensation hydraulic pump;
    wherein, when the engine is automatically stopped, the hydraulic supply control mechanism prevents the accumulator from supplying the operating oil, and the leaking flow compensation hydraulic pump supplies the operating oil to the automatic transmission to compensate for the flow rate of the operating oil leaking in the automatic transmission; and
    wherein, when the engine is automatically restarted after the engine is automatically stopped, the leaking flow compensation hydraulic pump stops supplying the operating oil, the reverse flow preventing mechanism prevents reverse flow of the operating oil from the accumulator to the leaking flow compensation hydraulic pump, and the hydraulic supply control mechanism supplies the operating oil accumulated in the accumulator to the starting frictional engagement device.

2. The hydraulic supply device according to claim 1, wherein the accumulator accumulates the operating oil supplied from a mechanical hydraulic pump driven by the engine.

3. The hydraulic supply device according to claim 1,
    wherein the automatic transmission is provided with a hydraulic detection port which is used for detecting hydraulic pressure at the time of checking an operation of the automatic transmission and at which an oil passage is connected to a mechanical hydraulic pump driven by the engine and the starting frictional engagement device, and wherein when the engine is automatically stopped, the leaking flow compensation hydraulic pump supplies the operating oil for compensating for the flow rate of the operating oil leaking in the automatic transmission to the automatic transmission through the hydraulic detection port.

4. The hydraulic supply device according to claim 3, wherein the automatic transmission is provided with a line pressure regulating valve that regulates a line pressure by regulating the pressure of the operating oil from the mechanical hydraulic pump, and the hydraulic detection port is used for detecting the line pressure at the time of checking the operation of the automatic transmission.

5. The hydraulic supply device according to claim 3, wherein the hydraulic detection port is used for detecting the hydraulic pressure of the starting frictional engagement device at the time of checking the operation of the automatic transmission.

6. The hydraulic supply device according to claim 1, wherein the automatic transmission is provided with a hydraulic detection port which is used for detecting hydraulic pressure at the time of checking an operation of the automatic transmission and at which an oil passage is connected to the starting frictional engagement device, and wherein when the engine is automatically restarted after the engine is automatically stopped, the hydraulic supply control mechanism supplies the operating oil accumulated in the accumulator to the starting frictional engagement device through the hydraulic detection port.

7. The hydraulic supply device according to claim 6, wherein the automatic transmission is provided with a line pressure regulating valve that regulates a line pressure by regulating the pressure of the operating oil from a mechanical hydraulic pump driven by the engine, and the hydraulic detection port is used for detecting the line pressure at the time of checking the operation of the automatic transmission.

8. The hydraulic supply device according to claim 6, wherein the hydraulic detection port is used for detecting the hydraulic pressure of the starting frictional engagement device at the time of checking the operation of the automatic transmission.

9. A hydraulic supply device of an automatic transmission, which supplies operating oil to the automatic transmission that is able to shift power from an engine and transmit the power to drive wheels of a vehicle by selectively engaging a plurality of frictional engagement devices using hydraulic pressure, the hydraulic supply device comprising:

an accumulator that accumulates operating oil;

a hydraulic supply control mechanism configured to allow or block supply of the operating oil from the accumulator to a starting frictional engagement device that is one of the plurality of frictional engagement devices to be engaged at the time of starting the vehicle;

a leaking flow compensation hydraulic pump that supplies the operating oil by a flow rate for compensating for a flow rate of the operating oil leaking in the automatic transmission by being driven by a power source different from the engine;

a reverse flow preventing mechanism configured to prevent reverse flow of the operating oil from the automatic transmission to the leaking flow compensation hydraulic pump;

wherein, when the engine is automatically stopped, the hydraulic supply control mechanism prevents the accumulator from supplying the operating oil, and the leaking flow compensation hydraulic pump supplies the operating oil to the automatic transmission to compensate for the flow rate of the operating oil leaking in the automatic transmission; and wherein, when the engine is automatically restarted after the engine is automatically stopped, the leaking flow compensation hydraulic pump stops supplying the operating oil, the reverse flow preventing mechanism prevents reverse flow of the operating oil from the accumulator to the leaking flow compensation hydraulic pump, and the hydraulic supply control mechanism supplies the operating oil accumulated in the accumulator to the starting frictional engagement device.

10. The hydraulic supply device according to claim 9, wherein the leaking flow compensation hydraulic pump is driven by the power source different from the engine to supply the operating oil at substantially the same flow rate as the flow rate of the operating oil leaking in the automatic transmission to the automatic transmission.

* * * * *